United States Patent [19]

Reinartz et al.

[11] 4,414,810

[45] Nov. 15, 1983

[54] FLUID RESERVOIR FOR A HYDRAULIC BRAKE SYSTEM

[75] Inventors: Hans-Dieter Reinartz, Frankfurt am Main; Magdalene Buerger, Bischofsheim, both of Fed. Rep. of Germany

[73] Assignee: ITT Industries, Inc., New York, N.Y.

[21] Appl. No.: 244,949

[22] Filed: Mar. 18, 1981

[30] Foreign Application Priority Data

Apr. 11, 1980 [DE] Fed. Rep. of Germany ....... 3013990

[51] Int. Cl.³ ............................................... F15B 7/00
[52] U.S. Cl. ...................................... 60/535; 60/585; 60/592
[58] Field of Search ................. 60/534, 535, 585, 592, 60/562; 137/262, 574

[56] References Cited

U.S. PATENT DOCUMENTS

| | | | |
|---|---|---|---|
| 3,542,055 | 11/1970 | Belart | 60/534 |
| 4,147,270 | 4/1979 | Brandon, Jr. | 60/592 |
| 4,185,750 | 1/1980 | Op den Camp | 60/592 |
| 4,217,922 | 8/1980 | Come | 60/592 |
| 4,297,846 | 11/1981 | Cadeddu | 60/585 |

FOREIGN PATENT DOCUMENTS

| | | | |
|---|---|---|---|
| 2642853 | 3/1977 | Fed. Rep. of Germany | 60/592 |
| 54-47118 | 4/1979 | Japan | 60/592 |
| 54-156975 | 12/1979 | Japan | 60/592 |

*Primary Examiner*—Abraham Hershkovitz
*Attorney, Agent, or Firm*—James B. Raden; Marvin M. Chaban

[57] ABSTRACT

A fluid reservoir for use with a tandem master cylinder is divided into two compartments by a partition wall with one of the two compartments being directly connected to a first outlet port connected to the master cylinder and the other of the two compartments being connected to a second outlet port connected to the master cylinder disposed in the one of the two compartments by a channel formed within the reservoir extending from the other of the two compartments through the partition wall to the second outlet port. This construction ensures the freest possible arrangement of the first and second ports at the bottom of the reservoir.

13 Claims, 7 Drawing Figures

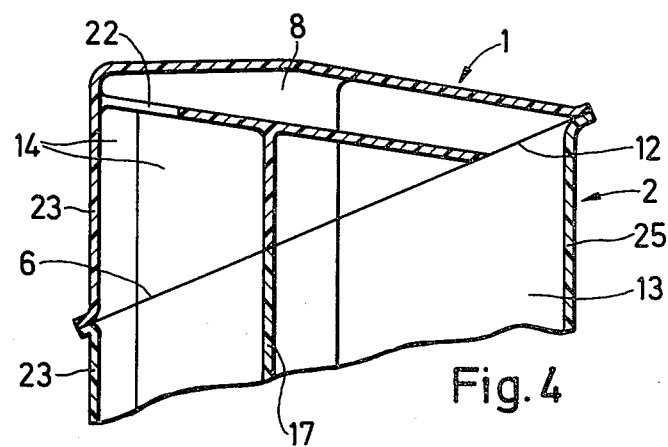
Fig. 4
Fig. 5
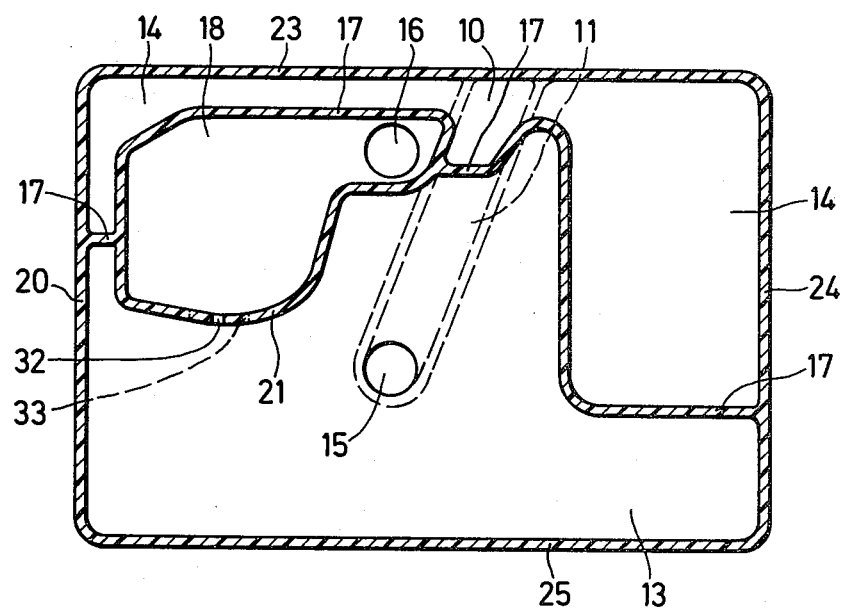

FLUID RESERVOIR FOR A HYDRAULIC BRAKE SYSTEM

BACKGROUND OF THE INVENTION

The present invention relates to a fluid reservoir for a multi-circuit hydraulic brake system, in particular for automotive vehicles, which comprises two reservoir housing sections including a lower section with ports for connecting to a master brake cylinder and an upper section with a filler hole and two electric fluid level warning devices communicating with two contact chambers in the housing, both housing sections being subdivided into two separate compartments by a partition wall including openings, with each of the compartments lying vertically below an associated one of the two contact chambers and having an associated one of the ports opening therein. A fluid reservoir of this type is known from German Patent DE-OS No. 2,855,171.

In the fluid reservoir known from German Patent DE-OS No. 2,855,171, the partition wall separating the two compartments extends below the filler hole vertically to the connecting line between the two ports connected to a master brake cylinder. When the reservoir is to be filled with brake fluid, this arrangement does not allow a sufficiently deep introduction of the filling device into the reservoir filler neck so that a perfect and safe guiding of the filling device in the filler hole is not ensured.

With the known subdivision of the fluid reservoir compartments, the two fluid level warning devices are arranged one behind the other relative to the connecting line between the two ports. The disadvantage of this arrangement is that in the event of an inclined position in the direction of the connecting line between the ports of the fluid reservoir, the two floats may show a substantial difference in level because of the resulting brake fluid level, so that a false alarm may be released by the fluid at the lower level.

If floats with relatively large diameters are to be arranged in the compartments of the fluid reservoir while at the same time one of the two compartments is to have the smallest possible volume, this is hardly realizable in the known fluid reservoir in which the compartments are arranged in series relative to the connecting line between the ports, because the float associated with each compartment is required to be at a sufficiently large distance from the walls bounding the associated compartment in order to ensure free movability of the float in this particular compartment. The result is an overdimensioned compartment so that part of the brake fluid in this compartment is not utilized, resulting in increased material cost.

SUMMARY OF THE INVENTION

It is an object of the present invention to provide a fluid reservoir of the type referred to hereinabove which ensures the freest possible arrangement of the ports at the bottom of the fluid reservoir, which has its filler hole exclusively in one compartment, which has one compartment substantially smaller than the other compartment, and which permits a relative alignment of both compartments which deviates from the direction of the connecting line.

A feature of the present invention is the provision of a fluid reservoir for a master brake cylinder of a multi-circuit hydraulic brake system for an automotive vehicle comprising: a reservoir housing including a lower section having at least two ports for connecting to the master cylinder and an upper section having a filler hole and two electric fluid level warning arrangements, the housing being subdivided into two separate compartments by a partition wall, each of the two compartments being disposed vertically below a different one of the two warning arrangements; one of the two ports being directly connected to one of said two compartments; and the other of the two ports being disposed in the one of the two compartments and connected to the other of the two compartments by a channel in the housing extending through the partition wall.

Thus, the reservoir of the present invention enables one of the two compartments to have its port arranged below the other of the two compartments. The construction of the reservoir of the present invention affords the advantage of permitting both compartments in the fluid reservoir to be of any desired construction while at the same time meeting all legal and customer requirements. Also, this free arrangement of the compartments allows a fluid reservoir construction to be optimally adapted to a vehicle.

It will be an advantage to form the channel integrally with the lower section and align it such that its area of cross-section projected in its longitudinal direction is outside the edge of the lower section. The integral construction of the lower section facilitates the manufacture so that additional manufacturing costs are not incurred. The advantageous arrangement of the channel permits ready removal of the core slide necessary for making the channel after the lower section has been formed in an injection molding die.

Preferably, it is also possible to provide in the compartment from which the channel extends, in the channel longitudinal direction, a space for removal of a core forming the channel integrally with the lower section. This arrangement enables the channel to extend along the bottom of the lower section, with the projected area of cross-section of the channel extending within the edge of the lower section in the channel longitudinal direction. By this favorable channel construction the smaller compartment chamber of the fluid reservoir is not much greater than the space required for removal of the core forming the channel.

There exists also the possibility of having the channel formed by an inserted tube if it is not possible to injection-mold the channel integrally with the lower section because of an unfavorable position or an intricate extension of the channel.

It will be an advantage to arrange the filler hole exclusively in one compartment. This arrangement permits a perfect and safe guiding of the filling device in the filler hole when fluid is filled into the reservoir.

A favorable sectioning of the compartments in the fluid reservoir is obtained by arranging the compartments adjacent to one another when viewed in the direction of the connecting line between the ports. The advantage of this arrangement is that the fluid reservoir is of a short overall length when viewed in the direction of a master brake cylinder.

In a top plan view of the reservoir, one compartment preferably embraces in the manner of a U a middle section of the other compartment receiving the filler neck, with the legs of the U-shaped compartment extending essentially parallel to the connecting line between the ports. This advantageous arrangement permits the brake fluid levels of both compartments to be seen through the transparent reservoir wall on both side walls of the fluid reservoir.

It is a further advantage to arrange the compartment with its filler hole at the free end and its port at the mounting end of the master brake cylinder, and to arrange the port of the other compartment close to the free end of the master brake cylinder and below the compartment. This provides free accessibility of filler cap and filler hole on all sides so that sufficient clearance of space is available for the filling operation.

Preferably, the overflow channel is provided in a side wall of the reservoir, and the openings of the overflow channel are arranged at equal level in the reservoir mounting position. Thereby part of the side wall of the reservoir also forms an overflow channel wall. An even fluid level is obtained by the openings of the overflow channel being arranged at the same level in the mounting position.

It will be an advantage to arrange the contact chambers vertically to the connecting line between the ports and to connect them by at least one line duct which is integrally formed with the upper section, serves to house the electrical line and to bleed air from a compartment and is located on the reservoir side close to the mounting end of the master brake cylinder. Such a contact chamber arrangement largely prevents a false alarm being released with the fluid reservoir in an inclined position. It will also be an advantage to form two line ducts integrally with the upper section, the ducts receiving the electrical lines and interconnecting both fluid level warning devices. This facilitates manufacture and saves high cost. A further cost reduction is obtained by providing at the same time for evacuation of air from one compartment through the line ducts.

BRIEF DESCRIPTION OF THE DRAWINGS

Above-mentioned and other features and objects of this invention will become more apparent by reference to the following description taken in conjunction with the accompanying drawings, in which:

FIG. 4 is a cross-sectional view along line I—I of FIG. 2;

FIG. 5 is a cross-sectional view along line II—II of FIG. 1;

DESCRIPTION OF THE PREFERRED EMBODIMENTS

Figure 1:
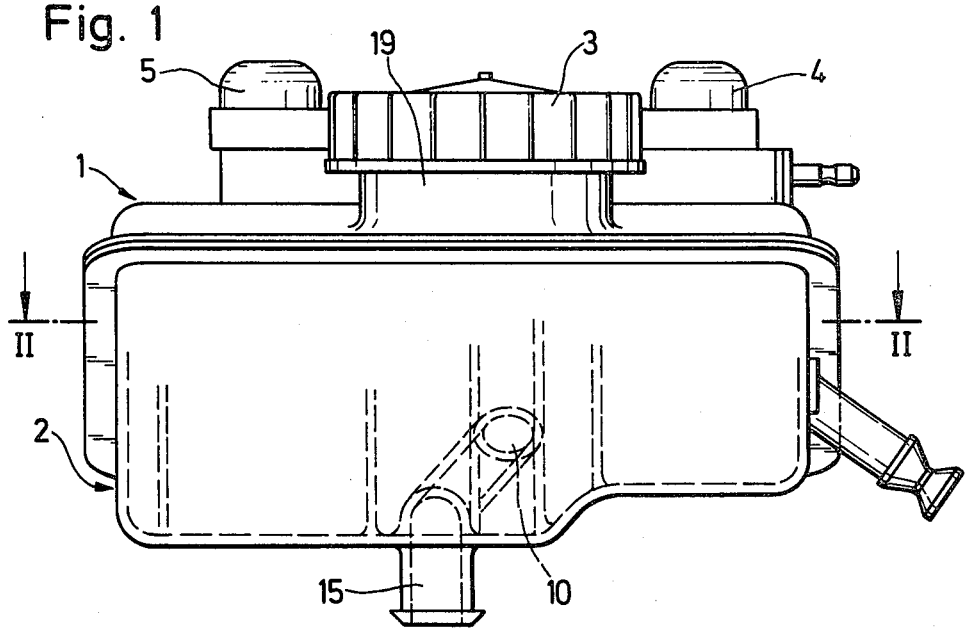
FIG. 1 is a front view of a fluid reservoir in accordance with the principles of the present invention, viewed in the direction of the master brake cylinder axis.
Figure 2:
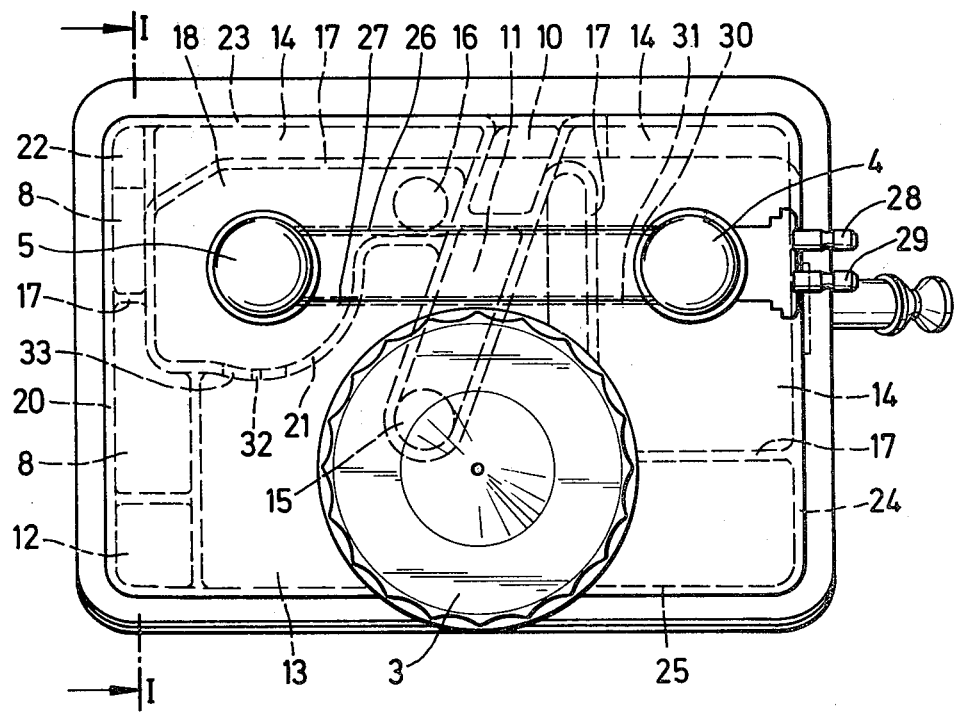
FIG. 2 is a top plan view of the reservoir of FIG. 1.
Figure 3:
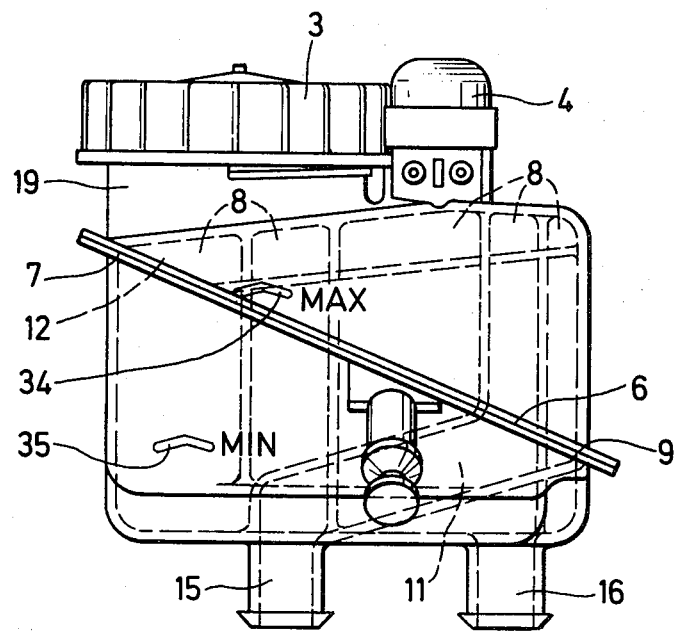
FIG. 3 is a side view of the fluid reservoir of FIGS. 1 and 2.

The fluid reservoir illustrated in FIGS. 1, 2, 3, 4, and 5 is subdivided into two single-piece reservoir housing sections, i.e., an upper section 1 and a lower section 2. Upper section 1 is equipped with filler cap 3 and the two fluid level warning devices or arrangements 4 and 5. Upper section 1 and lower section 2 have their edges durably connected along a diagonally extending connecting plane 6 lying in one single plane, for example, by welding or with adhesion. This plane is inclined not only relative to the axes of channels 8 and 11, but also relative to the bottom of lower section 2, and extends through a point 7 and a point 9 of upper section 1. The diagonally extending connecting plane 6 ensures completely free access to both the upper overflow channel 8 located in upper section 1 and the lower channel 11 located in lower section 2 through their respective channel inlet orifices 12 and 10. This facilitates the manufacture because it permits ready removal of two core slides forming the channels 8 and 11 after upper section 1 and lower section 2 have been formed.

The fluid reservoir illustrated comprises two compartments 13 and 14 having ports 15 and 16, respectively, leading to a master brake cylinder (not shown) of a multi-circuit hydraulic brake system. The two compartments 13 and 14 are separated by a partition wall 17. Extending through partition wall 17 along the side wall 20 is an overflow channel 8 which interconnects both compartments 13 and 14 and is arranged at such a level that in the event of depletion of one of fluid compartments 13 or 14 the fluid level then prevailing in the other compartment is scarcely below a predetermined level. Overflow channel 8 has its entrance from compartment 13 through channel inlet orifice 12. The output of overflow channel 8 which is also the input to compartment 14 is formed by channel outlet orifice 22.

Because the two compartments 13 and 14 are interconnected by an overflow channel 8, it will be sufficient to unscrew only one filler cap 3 from the filler hole 19 to open the fluid reservoir for filling it with brake fluid.

Both compartments 13 and 14 are bounded by side walls 20 and 24 of the fluid reservoir, while the front wall 25 is a boundary for compartment 13 and the rear wall 23 is a boundary for compartment 14. From compartment 14, a channel 11 extends through partition wall 17 to port 15 below compartment 13, channel 11 starting with its inlet orifice 10 in parting plane 6 of lower section 2 where it is formed by part of partition wall 17 and part of wall 23.

Extending into each of compartments 13 and 14 is a float (not shown) each float being connected to a different one of electric fluid level warning devices 4 and 5 provided at upper section 1. The float extending into compartment 13 is surrounded by a contact chamber 18 which is formed by part of wall 17 and part of wall 21. Compartment 14 also fulfills the function of a contact chamber.

The electric fluid level warning devices 4 and 5 provided in upper section 1 perpendicular to the connecting line between the two ports 15 and 16 are interconnected by two metallic lines 26 and 27 guided in line ducts 30 and 31, with associated contact terminals 28 and 29 protruding out of fluid level warning device 4. Line ducts 30 and 31 are so dimensioned that they also provide an arrangement for bleeding of compartment 14 through contact chamber 18. Air is evacuated from contact chamber 18 through opening 33 disposed in partition wall 21 above the MAX mark 34. The opening 32 provided in partition wall 21 below the MIN mark 35 supplies compartments 13 and chamber 18 with brake fluid.

Figure 6:
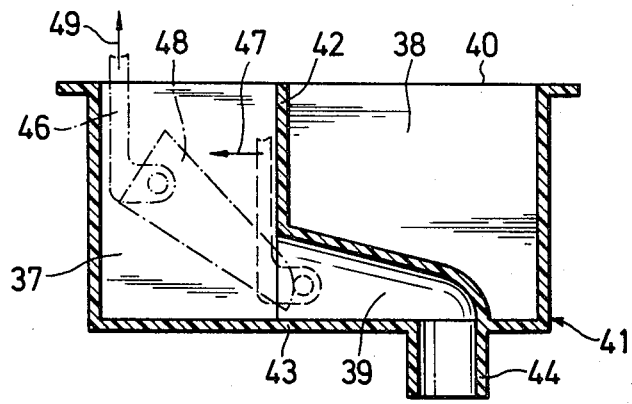
FIG. 6 is a cross-sectional view along line III—III of FIG. 7
Figure 7:
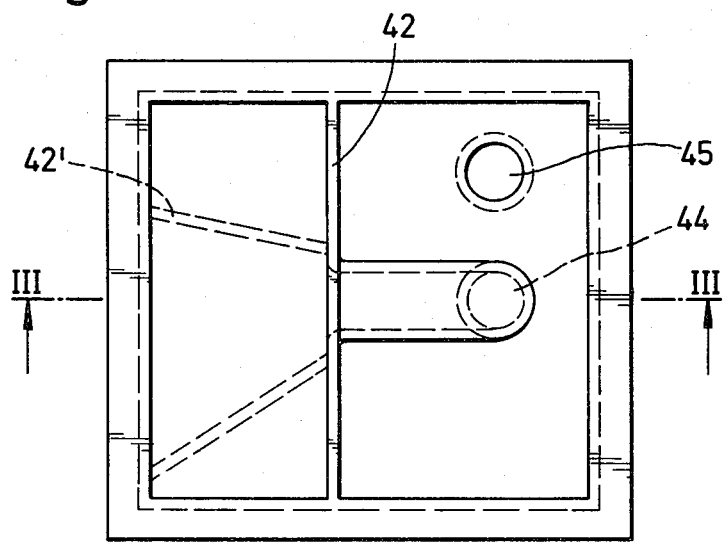
FIG. 7 is a top plan view of the lower section of another embodiment of a fluid reservoir in accordance with the principles of the present invention.

In another embodiment illustrated in FIGS. 6 and 7, a lower section 41 of a fluid reservoir is shown in which the parting plane 40 extends in a horizontal plane in the drawing. Channel 39 (corresponding to channel 11 of the previous embodiment) which extends along the bottom 43 of lower section 41 and below compartment 38 (corresponding to compartment 13 of the previous embodiment) connects compartment 37 to port 44 (corresponding to compartment 14 and port 15 of the previous embodiment), while port 45 (corresponding to port 16 of the previous embodiment) is below and directly connected to compartment 38. Such a construction of channel 39 is made possible by initially moving the core 48 forming channel 39 to the left when viewing the drawing, in the direction of arrow 47, by means of a hinged lever 46 provided thereat, whereupon it is withdrawn from the lower section 41 by vertical displacement in the direction of arrow 49.

The partition walls 42 and 42', which separates the two compartments 37 and 38 may be arranged in the fluid reservoir such that it just allows a withdrawal of core 48 forming channel 39.

While we have described above principles of our invention in connection with specific apparatus it is to be clearly understood that this description is made only by way of example and not as a limitation to the scope of our invention as set forth in the objects thereof and in the accompanying claims.

We claim:

1. A fluid reservoir for a master brake cylinder of a multi-circuit hydraulic brake system for an automotive vehicle comprising:
    a reservoir housing including a lower section having two ports for connecting to said master cylinder and an upper section having a filler hole and two electric fluid level warning arrangements, said housing being subdivided into two separate compartments by a partition wall, each of said two compartments being disposed vertically below a different one of said two warning arrangements;
    one of said two ports being in direct fluid connection with one of said two compartments; and
    the other of said two ports being disposed in said one of said two compartments and being in direct fluid connection with only the other of said two compartments by a channel in said housing extending through said partition wall.

2. A reservoir according to claim 1, wherein:
    said channel is formed integrally with said lower section and is aligned such that its area of cross-section projected in its longitudinal direction is outside the upper edge of said lower section.

3. A reservoir according to claim 1, wherein:
    said other of said two compartments has a width in the longitudinal direction of said channel to enable removal of a core employed to form said channel integrally with said lower section.

4. A reservoir according to claim 1, wherein:
    said channel is provided by an inserted tube.

5. A reservoir according to claim 1, 2, 3, or 4, wherein:
    said filler hole is disposed exclusively in said one of said two compartments.

6. A reservoir according to claim 5, wherein:
    when viewed from the top, said other of said two compartments embraces a middle portion of said one of said two compartments in the manner of a U with the legs of said U extending substantially parallel to a connecting line between said two ports.

7. A reservoir according to claim 6, wherein:
    said filler hole and said other of said two ports is disposed in said one of said two compartments adjacent a free end of said master cylinder and said one of said two ports is disposed in said one of said two compartments adjacent a mounting end of said master cylinder.

8. A reservoir according to claim 7, further including:
    an overflow channel connected between said two compartments in a side wall of said housing having openings at opposite ends thereof at the same level in a mounting position of said housing.

9. A reservoir according to claim 8, wherein:
    said two warning arrangements are disposed on a line perpendicular to a connecting line between said two ports, said two warning arrangements being connected by at least one line duct integrally formed with said upper section, said duct serving to house electric lines connected to said two warning arrangements and to bleed air from said two compartments, said duct exiting said housing at a side thereof adjacent a mounting end of said master cylinder.

10. A reservoir according to claims 1, 2, 3, or 4, wherein:
    when viewed from the top, said other of said two compartments embraces a middle portion of said one of said two compartments in the manner of a U with the legs of said U extending substantially parallel to a connecting line between said two ports.

11. A reservoir according to claims 1, 2, 3, or 4, wherein:
    said filler hole and said other of said two ports is disposed in said one of said two compartments adjacent a free end of said master cylinder and said one of said two ports is disposed in said one of said two compartments adjacent a mounting end of said master cylinder.

12. A reservoir according to claims 1, 2, 3, or 4, further including
    an overflow channel connected between said two compartments in a side wall of said housing having openings at opposite ends thereof at the same level in a mounting position of said housing.

13. A reservoir according to claims 1, 2, 3, or 4, wherein:
    said two warning arrangements are disposed on a line perpendicular to a connecting line between said two ports, said two warning arrangements being connected by at least one line duct integrally formed with said upper section, said duct serving to house electric lines connected to said two warning arrangements and to bleed air from said two compartments, said duct exiting said housing at a side thereof adjacent a mounting end of said master cylinder.

* * * * *